June 23, 1959     A. ECKSTEIN ET AL     2,891,323
APPARATUS FOR THE CONTROL AND ANALYSIS OF COLOR PRINTING
Filed July 13, 1955
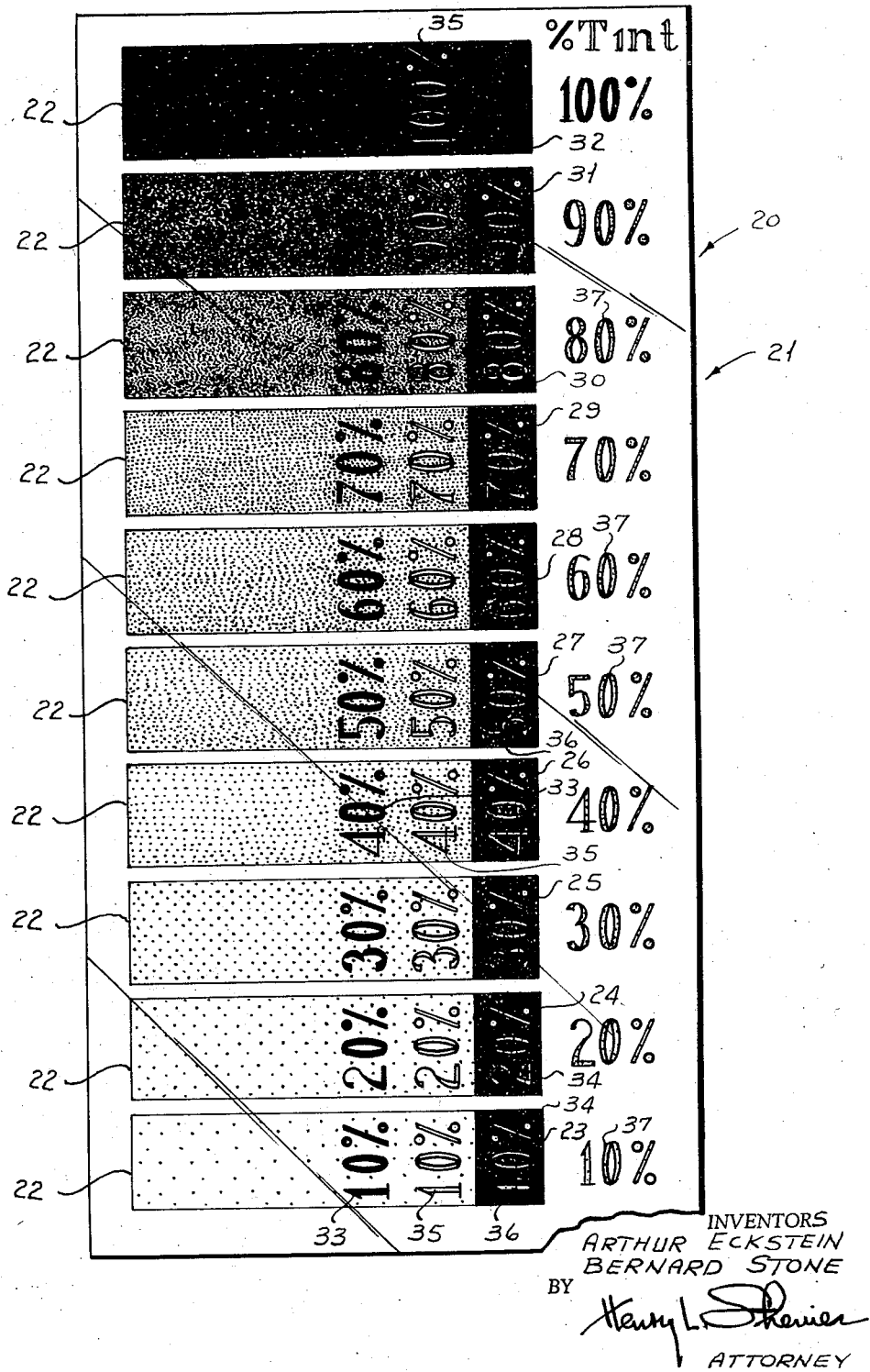
INVENTORS
ARTHUR ECKSTEIN
BERNARD STONE
BY
ATTORNEY 2,891,323

APPARATUS FOR THE CONTROL AND ANALYSIS OF COLOR PRINTING

Arthur Eckstein, North Hempstead, and Bernard Stone, New York, N.Y.

Application July 13, 1955, Serial No. 521,741

4 Claims. (Cl. 35—28.3)

The invention relates to the art of printing, and relates more particularly to methods of and means for determining in advance of actual printing the appearance of single or multiple color printing on stock, and for matching colors.

This is a continuation-in-part of our co-pending application Serial No. 387,276, filed October 20, 1953, now abandoned.

It is among the objects of the invention to provide methods and means that will show in advance of a color printing job how these colors and combinations will look on the actual stock. It is a further object of the invention to aid in determining what overprinting inks or tints are necessary to match a given color. It is another object of the invention to determine how the various possibilities of type, such as surprint, drop-out, tinted, colored, or black will appear when the job is finished and what proportions of inks will need to be mixed for the proper use.

With the above and other objects of the invention in view, the invention consists in the novel methods, construction, arrangement and combination of various devices, elements and parts, as set forth in the claims hereof, certain embodiments of the same being illustrated in the accompanying drawings and described in the specification.

In the accompanying drawing which forms part of the instant specification and which is to be read in conjunction therewith, the figure is a plan view of one sheet of the control system embodying the invention.

In carrying the invention into effect in the embodiments which have been selected for illustration in the accompanying drawings and for description in this specification, and referring now particularly to the figure, there are provided a series of sheets or elements 20 of which only one is exemplified in the figure. Each element 20 pertains to a single color. In accordance with a preferred arrangement, there is provided a group of eleven colors, and each color is assigned to one element 20, for instance as follows: black, process red, process yellow, process blue, red, yellow, blue, orange, green, violet (purple), brown.

Each element 20 is composed of a transparent thin, flat base 21, for instance made of acetate, on which there are printed or otherwise made adherent a series of patches, for instance ten patches indicated at 23–32. All the patches of one element 21 pertain to the same color. The patches are arranged in a sequence of tint gradations, for instance the solid color being shown at 32 at the top of the series of patches and the lightest among the tin gradations at 23 at the bottom of the base 21 which has in accordance with the exemplification a 10% tint. The other patches 24–31 are arranged therebetween, for instance according to a linear scale from 20% tint to 90% tint, respectively.

Each patch has a major area or field 22 in the particular tint grade assigned to the patch. In addition, each patch may be provided with other designs: for instance, each patch may have one or more designs 33 in solid color, an entire area 34 in solid color, and one or more areas 35 from which color has been completely omitted and which are transparent, and an area or areas 36 in the tint of the particular patch within the area of solid color 34. The legend "10% Tint" is surprinted at 33 in solid color over the particular color shade on the patch 23. The same legend is dropped out at 35. Finally, the legend is dropped out and screened in the color shade of the major area of the patch 23, over the area 34 which is of solid color and of the same shade as the patch 32.

The patches 24–31 are similarly arranged, except that in the legend the percentage set forth is changed in accordance with the tint shade of the particular patch. The solid color patch 32, however, has no solid imprints 33 or 34, and at 35 has the transparent legend 100%.

While we have shown print type, it will be understood that these areas may be of any shape, not necessarily in type, without departing from the spirit of the invention.

In the printing trade, 33 is known as "surprint," 35 as "drop-out," and 36 as "tinted in solid ink." Adjacent each patch there is printed at 37 the same legend, in the tint grade of the field 22 of the patch the percentage of tint, for instance the legend "10% Tint" for the patch 23, but the legend 100% for the patch 32; this is known as "Tinted on Stock" as it will appear on stock when the sheet 20 is superposed on a stock. All the tints are 110 line screen which gives good visual rendering for all screens from very coarse to very fine, but this is by way of exemplification only and should not be regarded in any limiting sense.

A pair of elements 20 of different respective colors may be superposed with all the patches of areas 23 to 32 of one element or sheet 20 registering with all the respective areas of the other sheet. With this relative position of the sheets various shades or tints of a composite color made up of the same respective percentages of tint of the colors of the two sheets are composed. The sheets may be shifted longitudinally with respect to each other to register different ones of the respective areas to show tints of the composite color including respective percentages of tint or degrees of saturation of the two colors of the elements 20. Again the two elements may be shifted laterally of each other to show a comparison between different tints of the two colors. It will be understood that more than two sheets or elements may be employed to compose colors in different various tints and shades. It will be seen that the elements 20 permit composition of colors in a large number of shades and tints. In this manner the appearance in a printed work of a color having any particular composition may be determined before the color is printed. The elements 20 also render possible the matching of the color combination of a product or of a section of a piece of art work, as well as the simulating of color combinations. The instant invention considerably enhances the usefulness of the patches by means of the areas 33, 34, 35, 36, and 37. These areas render possible the determining in advance of all possibilities of type in color. Type is the major means of communication in the graphic field.

Some exemplifications of use of the elements 20 will be given below, it being understood that they are illustrative only and not exhaustive, and that the elements 20 can also be used in the graphic arts in many other ways which will be obvious from the description and examples given.

Examples

For instance, if it is desired to visualize in advance how a 30% tint red will look on a drop-out of an 80% tint blue printed in combination with a 30% red on a white stock, the operator will superpose the patch 30 of the element 20 of the color blue over the white stock. Thereafter he will superpose on the area 35 of the patch 30 of the blue color the major part of the patch 25 of the element 20 of red color. The type will appear in one color on a background of a color composition of the two colors; in the example, given the type will appear in red color on a purple color background. Thus, he can plan the color combination of type legibility.

As a further exemplification, a tint of one color may be made to appear like printed within a field of another color. For this purpose the operator will register the legend 37 of the selected tint grade of one color with the drop-out 35 of a patch of selected tint grade of the second color. The type will appear then in one color surrounded by the background of the other. For instance, the legend 37 of a patch 27 of the color red may be registered with the legend 35 of a patch 27 of the color blue; the type will then appear in red on a blue background when superposed on white stock.

As a further exemplification, a tint of one color may be made to appear like printed over a field of another color. For this purpose the operator will place the legend 37 of a tint of one color over the field 22 of a patch of selected tint degree of a second color. The type will then appear as a color combination printed over the background formed by the second color. For instance, the legend 37 of the patch 27 of the color blue may be superposed over the field 22 of the patch 29 of the color red. The type would appear purple (as overprint) over a red background.

As another exemplification, a double drop-out may be simulated. The operator will register the legend 35 of a selected patch of a first color with the legend 35 of a selected patch of a second color and superpose it on a stock. The type will appear as a drop-out in the stock color within a background of the color combination. For instance, the legend 35 of the patch 27 of the color red may be superposed with a legend 35 of the patch 28 of the color blue, and the assembly superposed over a white stock. The type would then appear as a white drop-out within a purple background.

As color can be used effectively in a single color printing, a superposing of one element 20 on the stock will immediately reveal by looking at the area 33 how the solid color will appear on a selected tinted background of the same color on the stock.

Registering of two elements 20 immediately shows the combination of equal tones of the two colors. By moving either element 20 of two superposed elements up or down, the sequence can be changed, resulting from the combination of any number of tints. By bringing out of register any area, one can determine the effect of each tint as it will appear next to another tint, and to the combination of tints.

The size and the sequence of patches, as well as the legend type set on all the elements 20 is identical.

Color matching can be carried out by manipulation of the elements 20, by combining the proper tints of colors of various elements.

Where the areas 35–37 are other designs instead of prints, they preferably have again identical shapes, so that they may similarly be simulated and matched, in registry.

The instant invention has the advantage of planning color types within great numbers of varieties, without any need for costly corrections on the plates, and without any need even for proofs, as the final appearance on the stock can actually be seen, in color, in advance and changes be made until a satisfactory combination is reached, before the printing is started.

We wish it to be understood that we do not desire to be limited to the exact details of construction shown and described, for obvious modifications will occur to a person skilled in the art.

Having thus described the invention, what we claim as new and desire to be secured by Letters Patent is as follows:

1. Color printing composing apparatus for use with a stock which is to be color printed including in combination a first sheet of transparent material adapted to be laid over said stock, means forming a plurality of areas of one transparent hue on said first sheet, the respective areas of said first sheet being saturated with said hue to different predetermined degrees, a second sheet of transparent material adapted to be laid over said first sheet, means forming a plurality of areas of another transparent hue on said second sheet, means forming transparent legends on the respective areas of each of said sheets, means forming solid hue legends on the respective areas of each of said sheets, the legends of respective corresponding areas of the respective first and second sheets being adapted to register with each other, said second sheet being adapted to be moved with respect to said first sheet to lay an area of said second sheet over an area of said first sheet.

2. Apparatus as in claim 1 including means forming solid hue areas disposed adjacent the respective areas of each of said sheets, the solid hue areas of each of said sheets being of the same hue as the remaining areas of the sheet, respective legends formed in each of said solid hue areas, the legend of each area being of the same hue as and saturated to the same predetermined degree as the area adjacent which the solid hue area is disposed, each of said solid hue area legends of said one sheet being adapted to register with a corresponding transparent area of the other of said sheets.

3. Apparatus as in claim 1 in which each of said sheets includes means forming respective legends adjacent each of said areas, each of said adjacent legends being saturated with the hue of its associated sheet to a degree corresponding to the degree of saturation of the area adjacent which it is disposed.

4. Color printing composing apparatus for use with stock which is to be color printed including in combination a first sheet of transparent material adapted to be laid over said stock, means forming a plurality of areas of a transparent hue on said first sheet, the respective areas of said first sheet being saturated with said hue to different predetermined degrees, a second sheet of transparent material adapted to be laid over said first sheet, means forming a plurality of areas of another transparent hue on said second sheet, the respective areas of said second sheet being saturated with said other hue to different predetermined degrees, said second sheet being adapted to be moved with respect to said first sheet to lay an area of said second sheet over an area of said first sheet, means forming an area of solid hue adjacent each of said areas and a legend in each solid hue area, each of said legends being saturated with the same hue and to the same degree as the major area adjacent which its associated solid area is disposed.

References Cited in the file of this patent

UNITED STATES PATENTS

| | | |
|---|---|---|
| 1,528,621 | Lavers | Mar. 3, 1925 |
| 1,597,830 | Rueger | Aug. 31, 1926 |
| 1,704,605 | Heintze | Mar. 5, 1929 |
| 2,120,499 | Mackay | June 14, 1938 |
| 2,253,107 | Brooks | Aug. 19, 1941 |
| 2,522,723 | Rookyard | Sept. 19, 1950 |
| 2,641,853 | Helding | June 16, 1953 |

FOREIGN PATENTS

| | | |
|---|---|---|
| 664,863 | Great Britain | Jan. 16, 1952 |